Dec. 1, 1970         J. H. McALLISTER         3,544,406
METHOD AND APPARATUS FOR MAKING LIGHT PIPES
Filed March 27, 1968                    2 Sheets-Sheet 1
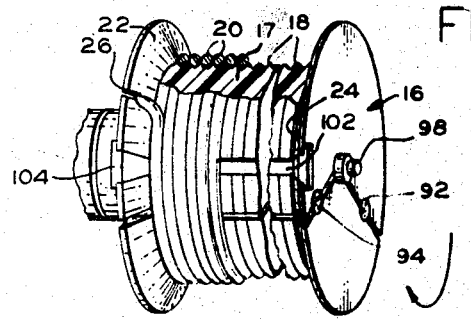
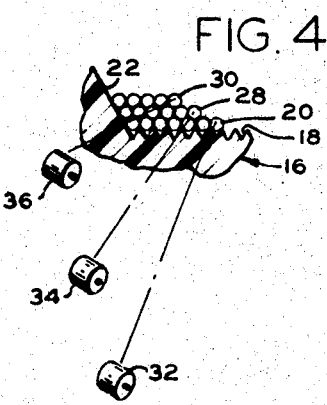
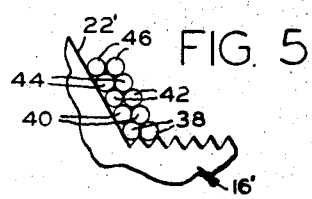
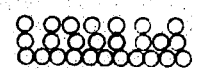
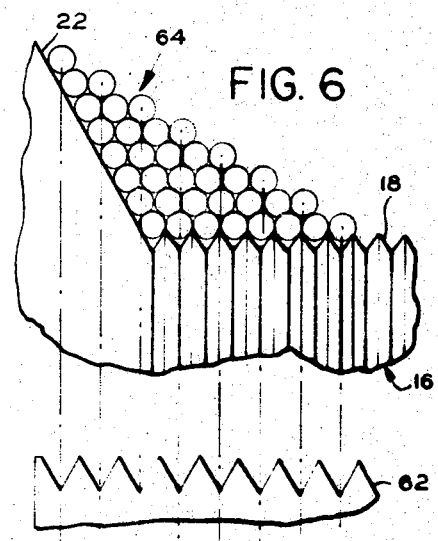
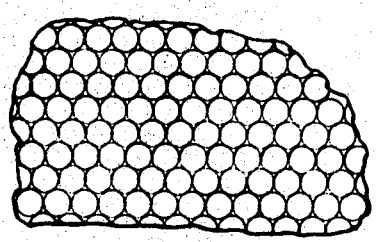
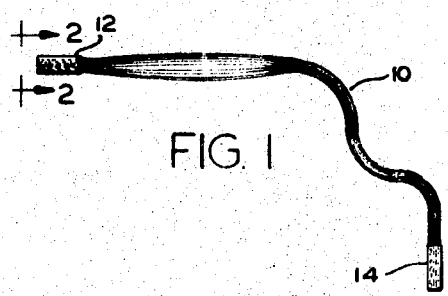
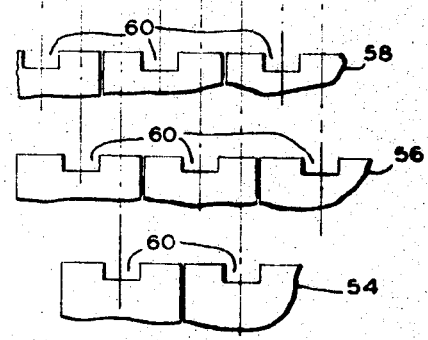
JOHN H. McALLISTER
INVENTOR
BY
BUCKHORN, BLORE, KLARQUIST & SPARKMAN
ATTORNEYS Dec. 1, 1970   J. H. McALLISTER   3,544,406
METHOD AND APPARATUS FOR MAKING LIGHT PIPES
Filed March 27, 1968   2 Sheets-Sheet 2
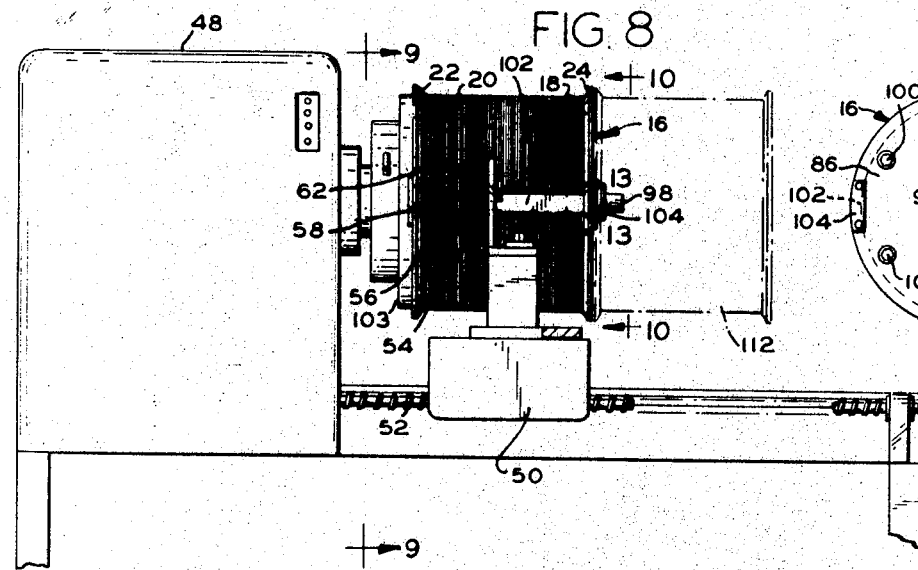
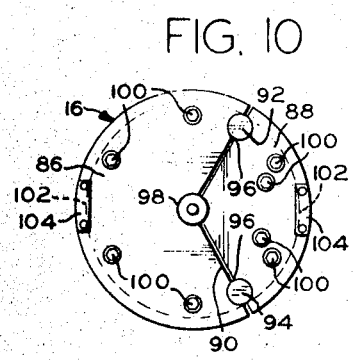
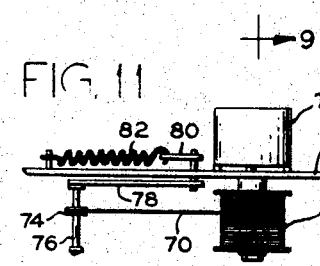
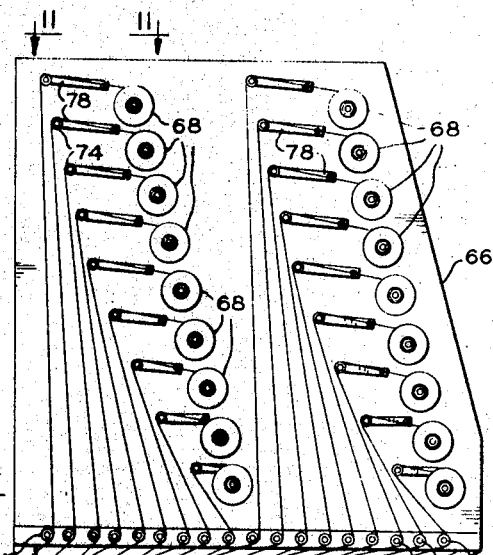
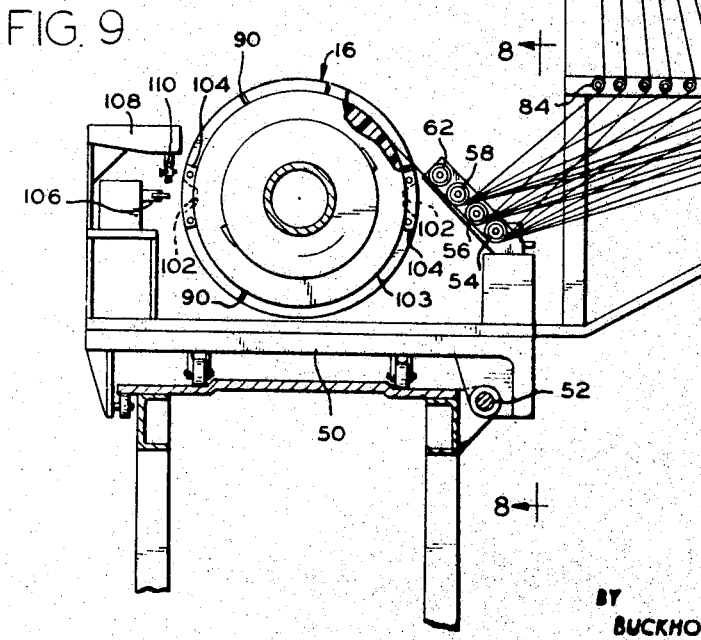
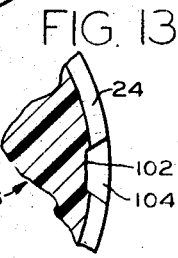
JOHN H. McALLISTER
INVENTOR
BY
BUCKHORN, BLORE, KLARQUIST & SPARKMAN
ATTORNEYS 3,544,406
METHOD AND APPARATUS FOR
MAKING LIGHT PIPES
John H. McAllister, Beaverton, Oreg., assignor to Tektronix, Inc., Beaverton, Oreg., a corporation of Oregon
Filed Mar. 27, 1968, Ser. No. 716,446
Int. Cl. B65h 81/00
U.S. Cl. 156—174                                  11 Claims

ABSTRACT OF THE DISCLOSURE

A fiber optic light pipe is formed by winding a first helix comprising contiguous turns of optical fiber material around a mandrel, and winding a plurality of other optical fiber helices over the first in the same helix direction. Successive helices are formed by directing the separate fiber strand forming each helix into the groove formed between and above turns of the helix immediately thereunder, to provide a closely packed and correctly aligned cross section of optical fibers. The centers of the fibers in successive helices are aligned diagonally with respect to the mandrel axis with each fiber substantially adjoining six others in honeycomb fashion. In a preferred embodiment, the various helices are wound substantially simultaneously with each successive helix being started at least one turn behind the previous helix so as to provide a groove for guiding each successive helix.

BACKGROUND OF THE INVENTION

A fiber optic light pipe comprises a bundle of substantially parallel optical fiber strands having a relatively high index of refraction. These strands are coated with a material having a relatively low index of refraction so that light entering the strand at one end is reflected therealong and leaves principally at the opposite end of the strand. In a light pipe configuration, the strand ends at the receiving end of the pipe are desirably oriented relative to one another in substantially the same manner as at the beginning of the pipe so that a light pattern presented at one end of the pipe will appear the same at the opposite end. Unfortunately, it has been difficult to achieve real identity between the configuration of fibers at the beginning and at the end of a bundle, and therefore accurate light image transmission is not greatly facilitated. Rather, a somewhat distorted version of the input pattern is generally received at the output of the pipe.

Light pipes are generally constructed by winding a fiber strand onto a mandrel to form a continuous helix after which the continuous helix is severed from the mandrel to provide one layer of light pipe. Then several such layers or bands are superimposed upon one another to form a complete pipe. Since the strands are quite small, e.g., on the order of ten thousandths of an inch in diameter, the alignment of the separate layers as well as the positioning of the individual strands between layers is difficult. The individual fibers tend to be misaligned, frequently presenting an end configuration as illustrated in FIG. 7. The output image produced is likely to be somewhat spotty and distorted.

SUMMARY OF THE INVENTION

In accordance with the present invention, a first helix of optical fiber material is closely wound around a mandrel to provde a helix formed of substantially contiguous turns. A plurality of other optical fiber helices are wound over the first in the same helix direction by applying further separate strands of optical fiber to the mandrel as the mandrel is rotated while directing the fiber strand forming each successive helix into the groove formed between and above the turns of the helix immediately thereunder. As a result, the centers of the fibers in successive helices are wound substantially diagonally with respect to the mandrel axis and each fiber substantially adjoins six others in honeycomb fashion to provide the closest possible packing as well as predetermined alignment. Adhesive material is applied to the helices at at least one circumferential location on the mandrel, e.g., in the direction across the helices and parallel to the mandrel axis, and the helices are severed at such location to provide the input and output ends of a coherent optic light pipe. A fiber optic light pipe is thus provided having substantially the same close packed configuration at both the input and output ends thereof whereby a true and undistorted light image of maximized intensity may be transmitted from the input end to the output end.

According to a preferred embodiment of the present invention, the successive helices wound upon the mandrel are wound thereon substantially simultaneously. Each successive helix is started at least a turn after the helix immediately thereunder, and the helix immediately thereunder thus provides a groove between turns for guiding the strand of the succeeding helix into a closely packed configuration. Moreover, the successive helices, since they are wound substantially simultaneously, may be wound quite rapidly and an entire coherent fiber optic light pipe completed economically in a short period of time. Since all helices are wound at the same time, the equipment is simplified and alignment problems are more easily avoided.

It is accordingly an object of the present invention to provide an improved method and apparatus for manufacturing a coherent fiber optic light pipe wherein the input and output configurations of optical fibers are substantially identical.

It is another object of the present invention to provide an improved method and apparatus for manufacturing a coherent fiber optic light pipe wherein the fibers are closely packed for the most efficient transmission of a light image.

It is a further object of the present invention to provide improved method and apparatus for manufacturing a coherent fiber optic light pipe wherein such light pipe may be quickly, accurately, and economically formed.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a plan view of a fiber optic light pipe;

FIG. 2 is an end view of a fiber optic light pipe formed according to the present invention;

FIG. 3 is a perspective view of a mandrel employed according to the present invention and illustrating a portion of the method according to the present invention;

FIG. 4 is a schematic illustration of a method according to the present invention;

FIG. 5 is an illustration of a variation of a method according to the present invention;

FIG. 6 is a schematic illustration of a portion of an apparatus according to the present invention;

FIG. 7 is an end view of a light pipe formed according to previous methods;

FIG. 8 is an elevational view, partially in cross section, of an apparatus for manufacturing a light pipe according to the present invention, this view being taken at 8—8 in FIG. 9;

FIG. 9 is a left end view of the FIG. 8 apparatus;

FIG. 10 is a right end view of a mandrel portion of the FIG. 8 apparatus;

FIG. 11 is a detail view of a portion of the FIG. 9 apparatus taken at 11—11 in FIG. 9;

FIG. 12 is an elevational view of the FIG. 11 detail; and

FIG. 13 is a cross sectional detail of a portion of the mandrel employed in the present invention as viewed at 13—13 in FIG. 8.

DETAILED DESCRIPTION

FIG. 1 illustrates a light pipe according to the present invention including a bundle 10 of substantially parallel optical fiber strands formed of material such as glass or plastic having a high index of refraction. The fiber strands may be quite small in diameter, for instance five thousandths of an inch, and are coated with a thin layer of material having a lower index of refraction. For example, the strands may be formed of polystyrene fiber optic material provided with an acrylic coating. At each end of the FIG. 1 light pipe the fiber strands are secured together in a predetermined pattern by means of solid end pieces 12 and 14. In the light pipe according to the present invention these end pieces suitably comprise epoxy resin blocks. The fiber strands have a predetermined and preferably identical geometric interrelation at 12 and 14, but therebetween the fibers in the bundle are freely and independently flexible.

According to the present invention a light pipe is provided where the strands at the transmitting and receiving ends of the light pipe are closely packed in a predetermined configuration. The configuration is illustrated in FIG. 2 where it is seen that each fiber in cross section substantially adjoins six other fibers in honeycomb fashion. This configuration not only produces maximum light transfer from the input to the output end of the light pipe, but also the configuration, representing the maximum packing density, is definite geometrically leading to identity between the input and output ends of the pipe as will hereinafter more fully appear. As already mentioned, the end of a prior art pipe is illustrated in FIG. 7 wherein irregular packing of the fiber optic strands leads not only to reduction in the amount of light transmitted but also to a spotty image appearance. Moreover, as a result of the methods heretofore employed in manufacturing such a pipe, the configuration of strands is frequently different at one end of the pipe from the other, leading to distortion in the image and a limitation on the usefulness of the article.

A coherent fiber optic light pipe according to the present invention is manufactured by winding plural fiber optic strands upon a mandrel 16 as illustrated in FIG. 3. Mandrel 16, which is suitably formed of nylon or other plastic material, e.g., Delrin, includes a central threaded drum portion 17 where the mandrel is grooved with a helical thread 18. A strand 20 of fiber optic material is wound into this groove or thread to form a first helix having the same helical direction as the thread. The pitch of thread 18 substantially equals the diameter of strand 20 so that winding the strand into the thread establishes contiguous turns with the helix formed by strand 20 having a position substantially matching that of the thread.

The mandrel 16 is also provided with a first end flange 22 and a second end flange 24, with at least the last flange 22 being inclined outwards toward the end of the mandrel at an angle to the mandrel axis. The strand 20 is wound upon mandrel 16 starting at inclined flange 22, for example by inserting the beginning end of a strand in a slot 26. The mandrel is then turned in the direction indicated by the arrow for winding the strand thereon. According to the present invention, a plurality of further optical fiber helices are wound over the first in the same helix direction so as to provide the cross sectional configuration illustrated in FIG. 2. Each successive helix is formed by supplying a further strand of optic fiber having substantially the same diameter to the mandrel while the mandrel is rotated. The fiber strands forming the successive helices are directed into grooves formed by the helix of fiber optic material located immediately therebelow. Mandrel 16 and strand 20 are not shown to scale in FIG. 3, but their dimensions are exaggerated for ease of explanation.

A preferred form of the method according to the present invention is illustrated in FIG. 4, schematically showing a broken-away, cross sectional portion of mandrel 16 having successive helices formed by fiber optic strands 20, 28, and 30 wound thereon. These strands are provided respectively from separate supply spools 32, 34 and 36. According to the preferred method, the helix formed by strand 20 is first started next to inclined flange 22 by placing the start of the strand in slot 26, after which the mandrel is turned at least one revolution. Then the helix formed by strand 28 is started, for example, by placing strand 28 in slot 26 in FIG. 3 and immediately above strand 20, and along inclined flange 22. The mandrel is then rotated through at least one further revolution, and strand 30 is similarly started. The cross section of helicies illustrated in FIG. 4 occurs after seven revolutions of the mandrel. As can be seen, the strands in cross section are aligned in diagonal columns relative to the axis of mandrel 16 with each strand, above the strand 20, being guided into the groove formed by the turns of the helix immediately therebelow, whereby to provide the desired closely packed honeycomb configuration. Since all fiber strands have the same diameter, the helices formed thereby are also contiguous. The angle of inclined flange 22 is parallel to the diagonal alignment subsequently produced by the fiber strands and accordingly the inclined flange functions to guide the strands into the desired configuration. Flange 22 is inclined at an angle of approximately 60 degrees relative to the axis of mandrel 16.

As the helices are wound, adhesive material, e.g., epoxy resin, is applied across the helices with each turn of the mandrel, at one or more given locations around the mandrel. With each turn of the mandrel, the adhesive material is applied to the leading ends of the helices at such location. Then, after the winding is completed, further adhesive material is suitably applied across the helices at such location. The helices are severed at such location after a suitable drying period to provide matching ends of the light pipe bonded in the adhesive material. Each end then appears as illustrated in FIG. 2. The regions where the fibers are not substantially tangent are filled with the adhesive material.

An alternative method according to the present invention is illustrated in FIG. 5 wherein respective strands 38, 40, 42, 44 and 46 form the beginning of respective superimposed helices wound on mandrel 16'. According to this variation, each of the five strands illustrated is provided from a separate supply reel, and each is started from inclined flange 22' at the same time. Again, the strands are wound to provide a columnar longitudinal cross section wherein the columns are diagonal with respect to the mandrel axis, with each strand above the bottom strand being supported by the strand therebelow. Two turns of strands are shown in FIG. 5. While this method is productive of the same configuration as illustrated in FIG. 2, the method of FIG. 4 is preferred because of the additional indexing afforded by a portion of a helix already wound below each succeeding helix.

Since the helices are wound at substantially the same time, according to the embodiments of FIGS. 4 and 5, a light pipe is rapidly manufactured with a minimum of difficulty, and providing a proper alignment for the fiber strands. The method is self-correcting in that each helix becomes a guide to the next, and, since all helices are wound at the same time, a strand feeding means suitably feeds all strands from substantially the same position at a given time, thereby enhancing the accuracy with which the light pipe is formed. The winding of all helices at the same time is found preferable to first completely winding one, and then the next, and so on, because of the necessity to then accurately duplicate the feeding operation a plurality of times.

An apparatus for accomplishing the method according to the present invention is illustrated in FIGS. 8 through 13. This apparatus again includes mandrel 16 having similar portions referred to by like reference numerals. Mandrel 16 is supported on a horizontal axis and is turned by power head 48 which suitably comprises part of a machine lathe or similar device. A feeding means or means for supplying a plurality of optical strands to the mandrel comprises a carriage 50 moved to the right along the mandrel by advance screw 52 as the mandrel 16 is rotated. The apparatus is arranged such that carriage 50 advances to the right by the diameter of one optical fiber strand for each rotation of mandrel 16. Carriage 50 supports three sets of feed rollers, 54, 56 and 58, disposed on shafts parallel to the axis of rotation of the mandrel. Portions of these sets of feed rollers are illustrated in greater detail in FIG. 6. The separate rollers on each shaft are provided with peripheral grooves 60 for accommodating and guiding individual optical fiber strands onto mandrel 16. The rollers of the respective sets 54, 56 and 58 are staggered so as to provide close spacing of fiber strands without the requirement of excessively small feed rollers. Between the feed rollers and mandrel 16 all strands pass over a further grooved feed roller 62 for finally aligning the strands in their correct position relative to the mandrel so that each strand falls in the groove formed by the helix immediately therebelow. In the instance illustrated in FIG. 6, the helices of optic fiber strands depicted at 64 have each been started a turn of the mandrel behind the helix therebelow. Consequently, if the diameter of the strands is ten thousandths of an inch, the pitch of the grooves on rollers 62 or the spacing between strands is fifteen thousandths of an inch as they are fed perpendicularly toward the mandrel.

A frame 66 is also supported on carriage 50 upon which are mounted supply spools 68 from which individual strands are unreeled. As illustrated more fully in FIGS. 11 and 12, a supply spool 68, from which strand 70 is unwound, is secured to the shaft of motor 72 supported by frame 66 and to which electric current is supplied for producing a rotational braking action upon spool 68. For example, motor 72 may comprise an A.C. hysteresis motor to which a D.C. current is applied. From spool 68 strand 70 passes over a small floating roller 74 movable along pin 76. Pin 76 is secured to crank arm 78 which turns with arm 80 on the opposite side of frame 66. Arm 80 is biased with spring 82 causing the floating roller 74 to bear against strand 70 and thereby provide slack take-up means for the strand. The electric current provided each motor 72 is desirably adjusted whereby the correct tension for each supply spool 68 is maintained. After passing guide roller 74, the individual strands pass over one of the guide rollers 84 at the bottom of frame 66 and from there to feed roller sets 54, 56 and 58. The fiber strands are suitably arranged so that, starting from the lower right of frame 66, the strands are accommodated by feed rollers 54, 56 and 58, repeated in that order, so that all these strands are fed substantially simultaneously to mandrel 16. In the illustrated embodiment, eighteen strands are fed simultaneously to mandrel 16, but this is by no means the limit of the number of strands which are suitably wound on the mandrel at the same time. An embodiment for winding forty-five strands simultaneously has been found more desirable for providing a light pipe of desirable width, and the present illustration is employed for purposes of explanation only.

Returning to mandrel 16, as illustrated in FIGS. 8, 9, 10 and 13, the mandrel is collapsible and comprises first and second spaced sector portions 86 and 88 wherein sector portion 88 is appreciably smaller than the other. Thus a longitudinal gap 90 extends the length of the mandrel Cylindrical spacer means 92 and 94 are keyed in longitudinal passages provided between the sector portions for locking the sector portions together. As long as the spacer means remain in place, sector 88 cannot be removed from sector 86, because the lips 96, for example, of the aforementioned passages, prevent movement of sector portion 88 to the right as shown in FIG. 10. The mandrel is also provided with a tapered central shaft member 98 received in a tapered axial hole in the mandrel for completing the assembly. Studs 100 are threaded at each end and are threadably received in end plate 103, and are provided with nuts at the end of the mandrel viewed in FIG. 10 for holding the mandrel in place on plate 103. Plate 103 is rotated by power head 48.

The mandrel is further provided with a pair of longitudinal outer grooves 102 extending along the central drum portion of the mandrel and extending also through the end flanges thereof, for example flange 24 as illustrated in FIG. 13. These grooves define circumferential locations for receiving adhesive material as the fiber optic strands are wound upon the mandrel. In addition, these grooves provide a location at which the fiber optic helices may be severed to provide one or more light pipes. A removable dam 104 is located at each end of each groove 102, being secured to the outside end of the mandrel to close off the end of the groove. The grooves together with the dams at each end provide a repository for the application of the adhesive material, e.g., epoxy resin, both as the helices are being wound as well as desirably after the winding process.

Also supported on carriage 50 is a solenoid actuated applicator 106 which receives epoxy resin from reservoir 108 through valve 110 and applies such resin to the fiber optic strand helices as the same are being wound. The applicator moves with the carriage and is therefore always in the same position relative to the configuration of fiber strands. As the mandrel rotates, the applicator 106 is synchronously actuated to apply epoxy resin to the helices at the location defined by grooves 102. This resin is applied across the leading ends of the respective helices and as the helices are wound, sufficient resin is applied for securing the fibers together to provide the desired configuration as illustrated in FIG. 2. The resin, of course, fills in the gaps between the fiber optic strands, principally where the strands are other than tangent to one another.

Operation of the apparatus according to the present invention is started as schematically illustrated in FIG. 6, wherein eight strands are diagrammatically illustrated as being wound upon mandrel 16. As hereinbefore described in connection with a preferred method embodiment of the present invention, each strand, starting with the one next to the grooved central drum portion of the mandrel, is started next to inclined flange 22 and the mandrel is preferably rotated one turn between successive starts. Eight strands have been started in this manner as illustrated in FIG. 6. Of course, in the embodiment illustrated in FIGS. 8 through 13, eighteen strands will be started in this manner. After all strands have been started on the mandrel, the mandrel is turned freely and the carriage 50 moves along the mandrel always in the correct position for feeding the strands perpendicularly to the mandrel. As previously described, superimposed helices are thereby formed along the mandrel with one corresponding to each strand. The strands are closely packed in diagonal columns and the honeycomb configuration is maintained throughout. As hereinbefore suggested, since all strands are fed substantially simultaneously from feed rollers mounted on the carriage, alignment problems are minimized between fibers, their configuration relative to one another being determined by the stable structure moving with carriage 50 as well as by the interwinding of the strands upon the mandrel in grooves provided by the helices themselves. As also hereinbefore indicated, the starting of the strands next to the inclined flange also guides each successive strand to nest in the groove provided by the helix formed immediately therebelow.

As the strands are formed, and with each half revolution of the mandrel, epoxy resin is applied by applicator 106 to secure the helices together. When the helices have been wound across mandrel 16 to the extent desired, furthr epoxy resin is desirably applied across the location defined by grooves 102 and the same is allowed to harden. The resin suitably contains a hardener. The means 92, 94 and 98 are removed from the mandrel, and the mandrel is collapsed somewhat to remove tension on the strands. Dams 104 are also removed. Then the helices are severed as by sawing along the location of one or both grooves 102 to provide one or more light pipes which may then be removed from the mandrel. Of course, the epoxy resin may be applied at only one groove 102 if desired, at which point the strands are severed, and only one light pipe will then be formed. The resin forms the blocks or end pieces at the ends of a light pipe.

The apparatus and method may be extended if desired by the provision of a further matching mandrel part 112 secured to mandrel 16, with flange 24 being omitted. Then more fiber may be wound on part 112 for example, after light pipes have been formed upon and removed from mandrel 16. Mandrel 16 is, of course, left in place and the helices are suitably severed between mandrels or mandrel parts.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A method of manufacturing a coherent fiber optic light pipe comprising the steps of:
    winding a first helix of optical fiber material around a mandrel by rotating said mandrel while supplying a strand of optical fiber thereto to provide contiguous turns forming said helix,
    winding a plurality of other optical fiber helices over the first in the same helix direction by supplying further strands of optical fiber to the mandrel as the mandrel is rotated, while directing the fiber strand forming each successive helix into the groove formed between and above turns of the helix immediately thereunder to provide a closely packed cross section of optical fibers wherein the centers of fibers in successive helices are aligned substantially diagonally with respect to the mandrel axis,
    applying an adhesive material across said helices at at least one location on said mandrel,
    and severing said helices at said location to provide a coherent fiber optic light pipe with ends defined at the severed location.

2. The method according to claim 1 wherein successive helices are wound on said mandrel substantially simultaneously.

3. The method according to claim 2 wherein adhesive is applied to said helices at each turn of the mandrel to provide adherence between successive helices.

4. The method of manufacturing a coherent fiber optic light pipe comprising the steps of:
    substantially contiguously winding a first helix of optical fiber material around a mandrel by rotating said mandrel while continuously supplying a strand of optical fiber thereto so that each turn of said helix is substantially contiguous with the next,
    substantially simultaneously winding a plurality of other fiber optical helices over the first in the same helix direction by supplying separate plural strands of optical fiber, each having substantially the same diameter as the optical fiber forming the first helix, to the rotating mandrel, with each successive helix being started at least a turn behind the previous helix, while directing the fiber forming each successive helix into the groove formed above and between the turns of the helix immediately thereunder to provide a closely packed cross section of optical fibers with the centers of fibers in successive helices being aligned diagonally with respect to the mandrel axis so that each fiber substantially adjoins six others,
    applying an adhesive material across said helices at at least one location on said mandrel,
    and severing said helices at said location to provide a coherent fiber optic light pipe with ends defined at the severed location.

5. The method according to claim 4 wherein said adhesive material is applied to said helices at said location at each turn of the mandrel for securing successive helices to one another.

6. The method according to claim 4 wherein each helix is started from an inclined flange at one end of said mandrel, wherein said flange is inclined at an angle to the axis of said mandrel substantially parallel to the desired diagonal alignment of said fibers to insure such diagonal alignment and close packing of said fibers.

7. The method according to claim 6 wherein said flange is inclined at an angle of approximately 60 degrees measured from the axis of said mandrel.

8. The method according to claim 6 wherein said mandrel is grooved with a pitch thread for matching the first helix, wherein the pitch thereof is equal to the diameter of said optical fiber material.

9. The method of manufacturing a coherent fiber optic light pipe comprising the steps of:
    substantially continuously winding a plurality of optical fibers onto a mandrel starting with an inclined flange at one end of said mandrel which is inclined outwardly towards the end of the mandrel, the fibers along the flange being aligned diagonally.
    rotating said mandrel while directing said plurality of fibers onto said mandrel to form successive diagonal columns wherein each fiber outward from the fiber adjoining the mandrel drum is supported by the fibers thereunder to provide a closely packed cross section of optical fibers wherein each fiber substantially adjoins six other fibers,
    applying adhesive material across said fibers at at least one location of the mandrel with each rotation of the mandrel to secure said fibers together, and severing said fibers at said location to provide a coherent fiber optic light pipe with ends defined at the severed location.

10. The method according to claim 9 wherein the winding of said strands is started simultaneously at said inclined flange.

11. The method according to claim 9 wherein the winding of each successive strand beyond the first next to the mandrel drum is started at least one turn of the mandrel after the start of the winding of the strand thereunder to provide a groove formed by two strands into which each successive strand is directed.

References Cited

UNITED STATES PATENTS

| 2,992,956 | 7/1961 | Bazinet | 156—99 |
| 3,033,731 | 5/1962 | Cole | 156—175 |
| 3,104,191 | 9/1963 | Hicks et al. | 156—174 |
| 3,215,029 | 11/1965 | Woodcock | 156—174 |

CARL D. QUARFORTH, Primary Examiner

B. H. HUNT, Assistant Examiner

U.S. Cl. X.R.

156—99